(12) United States Patent
Higuchi et al.

(10) Patent No.: US 11,431,173 B2
(45) Date of Patent: Aug. 30, 2022

(54) DEVICE AND METHOD FOR PERFORMING ELECTRICAL POWER DEMAND CONTROL

(71) Applicant: PANASONIC INTELLECTUAL PROPERTY MANAGEMENT CO., LTD., Osaka (JP)

(72) Inventors: Yuichi Higuchi, Osaka (JP); Hiroshi Amano, Osaka (JP); Yosuke Tajika, Hyogo (JP); Taichi Shimizu, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 212 days.

(21) Appl. No.: 16/626,231

(22) PCT Filed: Jun. 25, 2018

(86) PCT No.: PCT/JP2018/024033
§ 371 (c)(1),
(2) Date: Dec. 23, 2019

(87) PCT Pub. No.: WO2019/004140
PCT Pub. Date: Jan. 3, 2019

(65) Prior Publication Data
US 2020/0119555 A1 Apr. 16, 2020

(30) Foreign Application Priority Data

Jun. 27, 2017 (JP) .............................. JP2017-125269

(51) Int. Cl.
*H02J 3/14* (2006.01)
*H02J 13/00* (2006.01)

(52) U.S. Cl.
CPC ........ *H02J 3/144* (2020.01); *H02J 13/00002* (2020.01)

(58) Field of Classification Search
None
See application file for complete search history.

(56) References Cited

U.S. PATENT DOCUMENTS

| 8,260,471 B2* | 9/2012 | Storch ................. H02J 3/14 |
| | | 700/295 |
| 8,942,854 B2* | 1/2015 | Mauk ................. G06F 1/26 |
| | | 700/295 |

(Continued)

FOREIGN PATENT DOCUMENTS

| JP | 2003-005816 A | 1/2003 |
| JP | 2003-039283 A | 2/2003 |

(Continued)

OTHER PUBLICATIONS

Biegel et al., "Primary Control by ON/OFF Demand-Side Devices," IEEE, 2013, 11pg. (Year: 2013).*

(Continued)

*Primary Examiner* — Ryan D. Coyer
(74) *Attorney, Agent, or Firm* — McDermott Will & Emery LLP

(57) ABSTRACT

Power demand control is performed without a decrease in productivity. A device for performing electric power demand control includes: a processor; and a storage medium including an instruction for causing the processor to obtain a sum of energy consumption of a plurality of manufacturing devices, obtain a production capacity from production information on each manufacturing device, and perform electric power demand control on a manufacturing system based on the production capacity and the sum of energy consumption. To perform electric power control includes determining that electric power demand control is necessary if the sum of energy consumption reaches a predetermined threshold and excluding one of the manufacturing devices having a small- (Continued)

est production capacity from a target of electric power demand control.

4 Claims, 4 Drawing Sheets

(56) References Cited

U.S. PATENT DOCUMENTS

| | | |
|---|---|---|
| 9,564,755 B2 * | 2/2017 | Lee .................... H02J 3/008 |
| 10,867,087 B2 * | 12/2020 | Meagher ................ G06F 30/00 |
| 2004/0254674 A1 | 12/2004 | Nojo et al. |
| 2016/0370817 A1 | 12/2016 | Kawai |
| 2017/0212502 A1 * | 7/2017 | Morita ................ G05B 19/416 |
| 2017/0261967 A1 * | 9/2017 | Shimura .......... G05B 19/41865 |

FOREIGN PATENT DOCUMENTS

| | | |
|---|---|---|
| JP | 2006-031588 A | 2/2006 |
| JP | 2010-240915 A | 10/2010 |
| JP | 2013-114576 A | 6/2013 |
| JP | 2015-163010 A | 9/2015 |
| JP | 2015-171192 A | 9/2015 |

OTHER PUBLICATIONS

Callaway et al., "Achieving Controllability of Electric Loads," IEEE, 2010, 16pg. (Year: 2010).*

Siano, Pierluigi, "Demand response and smart grids—A survey," ScienceDirect, 2014, 18pg. (Year: 2014).*

International Search Report issued in International Patent Application No. PCT/JP2018/024033 dated Jul. 24, 2018; with English translation.

* cited by examiner

DEVICE AND METHOD FOR PERFORMING ELECTRICAL POWER DEMAND CONTROL

CROSS-REFERENCE OF RELATED APPLICATIONS

This application is the U.S. National Phase under 35 U.S.C. § 371 of International Patent Application No. PCT/JP2018/024033, filed on Jun. 25, 2018, which in turn claims the benefit of Japanese Application No. 2017-125269, filed on Jun. 27, 2017, the entire disclosures of which Applications are incorporated by reference herein.

TECHNICAL FIELD

The present disclosure relates to a technique for performing electric power demand control on a manufacturing system.

BACKGROUND ART

In manufacturing fields, it is generally required to appropriately control electric power for use in manufacturing without a decrease in productivity. Many facilities requiring bulk electric power (e.g., factories using high-voltage power) sign contracts with electric power suppliers to pay a basic charge determined based on a maximum allowable electric power for the facilities. Such a contract is generally called a demand contract, and the maximum allowable electric power is generally called a contracted electric power. The electric power basic charge based on the demand contract is applied unless electric power consumed in a facility exceeds a contracted electric power. If power consumption exceeds the contracted electric power only for about 30 minutes, however, the basic charge at and after the next month is significantly increased. In view of this, to perform control for preventing power consumption from exceeding the contracted electric power (also referred to as electric power demand control), a large number of techniques have been proposed to date in order to monitor power consumption or to reduce electric power demand.

A power management system described in Patent Document 1, for example, reduces power consumption by selecting a controllable device from a plurality of manufacturing devices. To perform electric power demand control without a decrease in production efficiency and degradation of environments, Patent Document 2 focuses on an operating time and a non-operating time of factory lines and defines a line whose non-operating time occupies a large proportion as a non-effective line so that electric power demand control is performed on this line.

CITATION LIST

Patent Documents

PATENT DOCUMENT 1: Japanese Unexamined Patent Publication No. 2010-240915
PATENT DOCUMENT 2: Japanese Unexamined Patent Publication No. 2015-171192

SUMMARY OF THE INVENTION

Technical Problem

In techniques proposed to date as described above, facilities to be subjected to electric power demand control are selected based on the level of electric power in operation. Thus, a device serving as a bottleneck of manufacturing is unintentionally selected as a target of electric power demand control, and as a result, productivity of the entire manufacturing system decreases.

An object of the present disclosure is to perform electric power demand control without a decrease in productivity.

Solution to the Problem

A device for performing electric power demand control according to the present disclosure is a device for performing electric power demand control on a manufacturing system including a plurality of manufacturing devices connected in series and includes: one or more processors; and one or more non-transitory computer-readable storage media including an instruction for causing the one or more processor to receive values of power consumption of the plurality of manufacturing devices, obtain a sum of energy consumption of the plurality of manufacturing devices from the values of power consumption, receive production information on each of the plurality of manufacturing devices, obtain a production capacity of each of the plurality of manufacturing devices from the production information, and perform electric power control on the manufacturing system based on the production capacity of each of the plurality of manufacturing devices and the sum of energy consumption of the plurality of manufacturing devices. To perform electric power control on the manufacturing system includes determining that electric power demand control is necessary if the sum of energy consumption reaches a predetermined threshold and excluding one of the plurality of manufacturing devices having a smallest production capacity from a target of electric power demand control.

With this configuration, since the manufacturing device having the smallest production capacity is excluded from the target of electric power demand control, electric power demand control can be performed without a decrease in production efficiency of the manufacturing system.

A method for performing electric power demand control according to the present disclosure is a method for performing electric power demand control on a manufacturing system including a plurality of manufacturing devices connected in series, and includes: causing the processor to receive values of power consumption of the plurality of manufacturing devices; causing the processor to obtain a sum of energy consumption of the plurality of manufacturing devices from the values of power consumption; causing the processor to receive production information on each of the plurality of manufacturing devices; causing the processor to obtain a production capacity of each of the plurality of manufacturing devices from the production information; and causing the processor to perform electric power control on the manufacturing system based on the production capacity of each of the plurality of manufacturing devices and the sum of energy consumption of the plurality of manufacturing devices. To perform electric power control on the manufacturing system includes determining that electric power demand control is necessary if the sum of energy consumption reaches a predetermined threshold and excluding one of the plurality of manufacturing devices having a smallest production capacity from a target of electric power demand control.

Advantages of the Invention

According to the present disclosure, electric power demand control can be performed without a decrease in production efficiency of the manufacturing system. As a result, an increase in electric power charge can be prevented or reduced.

DESCRIPTION OF EMBODIMENTS

Figure 1:
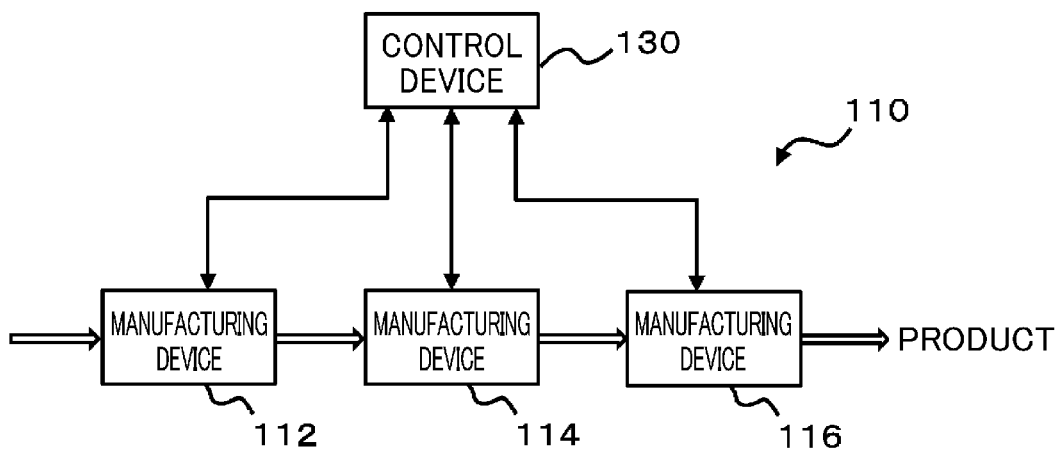
FIG. 1 is a block diagram illustrating an example configuration of a manufacturing system as a control target.

An embodiment of the present disclosure will be described hereinafter with reference to the drawings. In the drawings, like reference characters have been used to designate identical or equivalent elements.

FIG. 1 is a block diagram illustrating an example configuration of a manufacturing system 110 as a control target. The manufacturing system 110 includes manufacturing devices 112, 114, and 116 that are connected in series. For example, the manufacturing device 112 is a processing machine, the manufacturing device 114 is a pressing machine, and the manufacturing device 116 is a welding machine. The manufacturing devices 112, 114, and 116 perform processes in this order, and manufacture given products as a whole of the manufacturing system 110. The products are not limited to finished products, but include intermediate products that are yet to be finished products. Each of the manufacturing devices 112, 114, and 116 may be a solder printer, a mounter, a cutter, a molder, a tester, a cleaner, a heating furnace, or so forth. The manufacturing devices 112, 114, and 116 have different manufacturing capacities per unit time. Buffers for storing manufactured products in process may be disposed between the manufacturing devices 112, 114, and 116.

The control device 130 performs electric power demand control on the manufacturing system 110, and controls operations of the manufacturing devices 112, 114, and 116 individually. The control device 130 may be connected to the manufacturing devices 112, 114, and 116 through a communication network or without interposition of a communication network.

Figure 2:
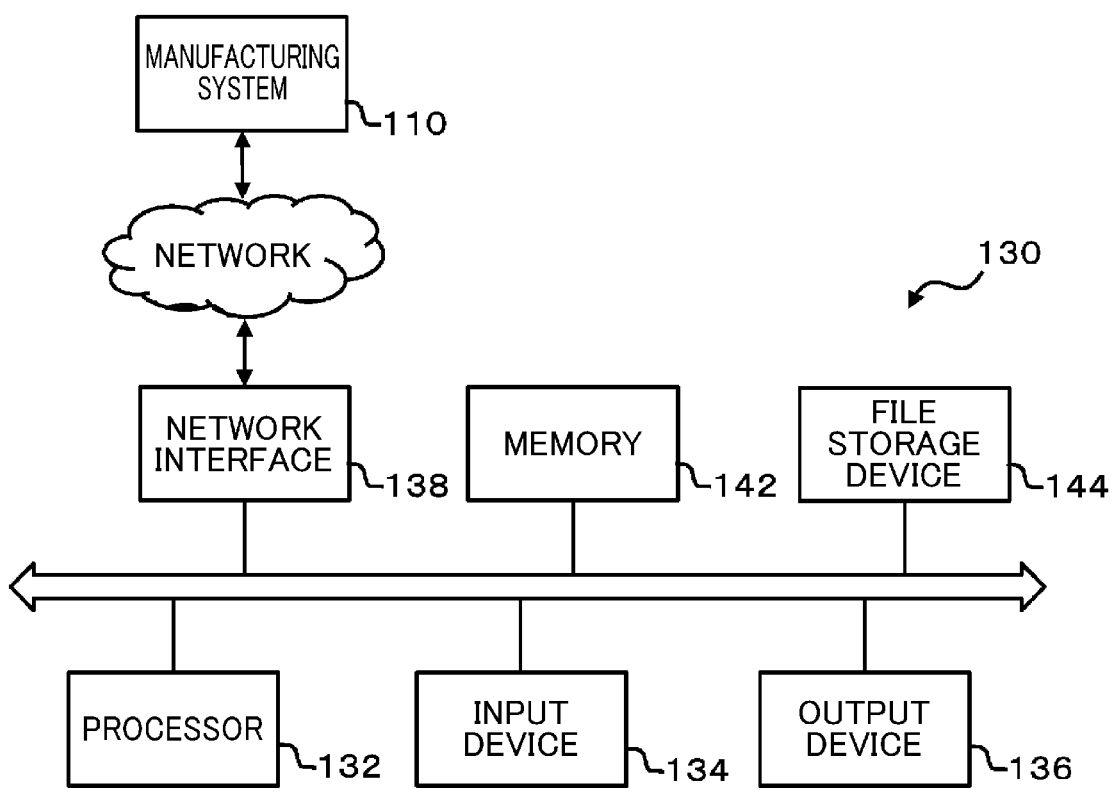
FIG. 2 is a block diagram illustrating an example configuration of a control device according to an embodiment of the present disclosure.

FIG. 2 is a block diagram illustrating an example configuration of a control device 130 according to an embodiment of the present disclosure. The control device 130 in FIG. 2 is specifically a computer system, and includes a processor 132, an input device 134, an output device 136, a network interface 138, a memory 142, a file storage device 144, and a bus 146.

The processor 132 communicates with other components through the bus 146. The network interface 138 transmits and receives data to/from a communication network such as the Internet. The network interface 138 is connected to the communication network by wires or wirelessly, and is connected to the manufacturing system 110 through the communication network.

Each of the memory 142 and the file storage device 144 is one or more volatile or nonvolatile non-transitory computer-readable storage media. The memory 142 includes, for example, a random access memory (RAM) and a read only memory (ROM), and stores data and instructions. The file storage device 144 may include a semiconductor memory such as RAM, a ROM, an electrically erasable programmable read only memory (EEPROM), or a flash memory, a magnetic recording medium such as a hard disk drive, an optical recording medium, and a combination thereof, for example. In a case where the embodiment of the present disclosure is implemented by software, a microcode, a code of an assembly language, or a code of a higher-level language can be used. The memory 142 or the file storage device 144 stores a program including instructions described in these codes and used to implement functions of the embodiment of the present disclosure. The processor 132 operates in accordance with such a computer program to thereby achieve functions of the processor 132.

The input device 134 may include, for example, a touch screen, a keyboard, a remote controller, and a mouse. The output device 136 may include a flat panel display such as a liquid crystal display or an organic EL display.

Figure 3:
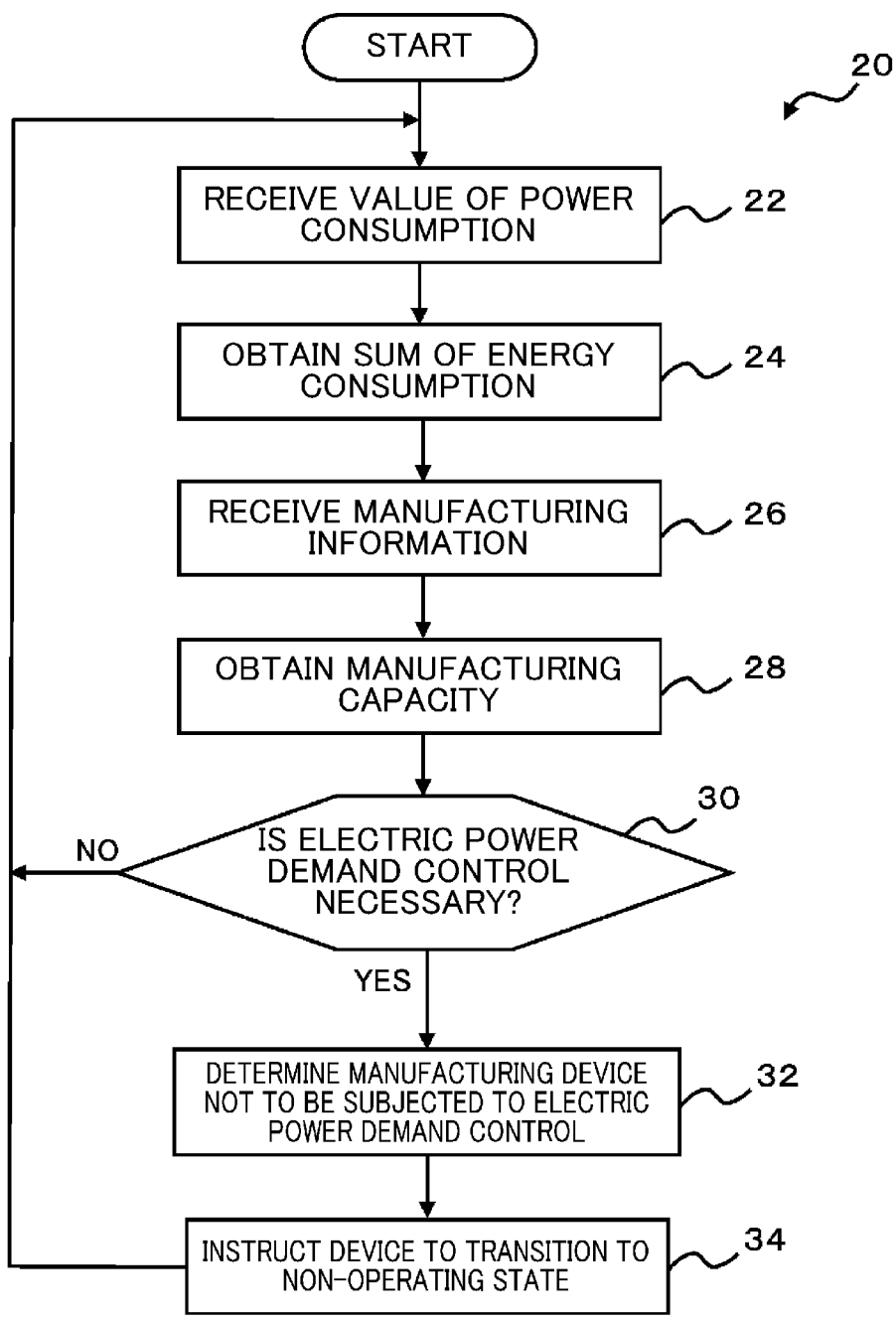
FIG. 3 is a flowchart depicting an example flow of a process of electric power demand control by the control device in FIG. 2.

FIG. 3 is a flowchart depicting an example flow of a process of electric power demand control by the control device 130 in FIG. 2. In the control device 130, target energy consumption for electric power demand control in the manufacturing system and a determination threshold for determining whether demand controls is necessary or not are previously set. The electric energy is a time integral of power.

Figure 4:
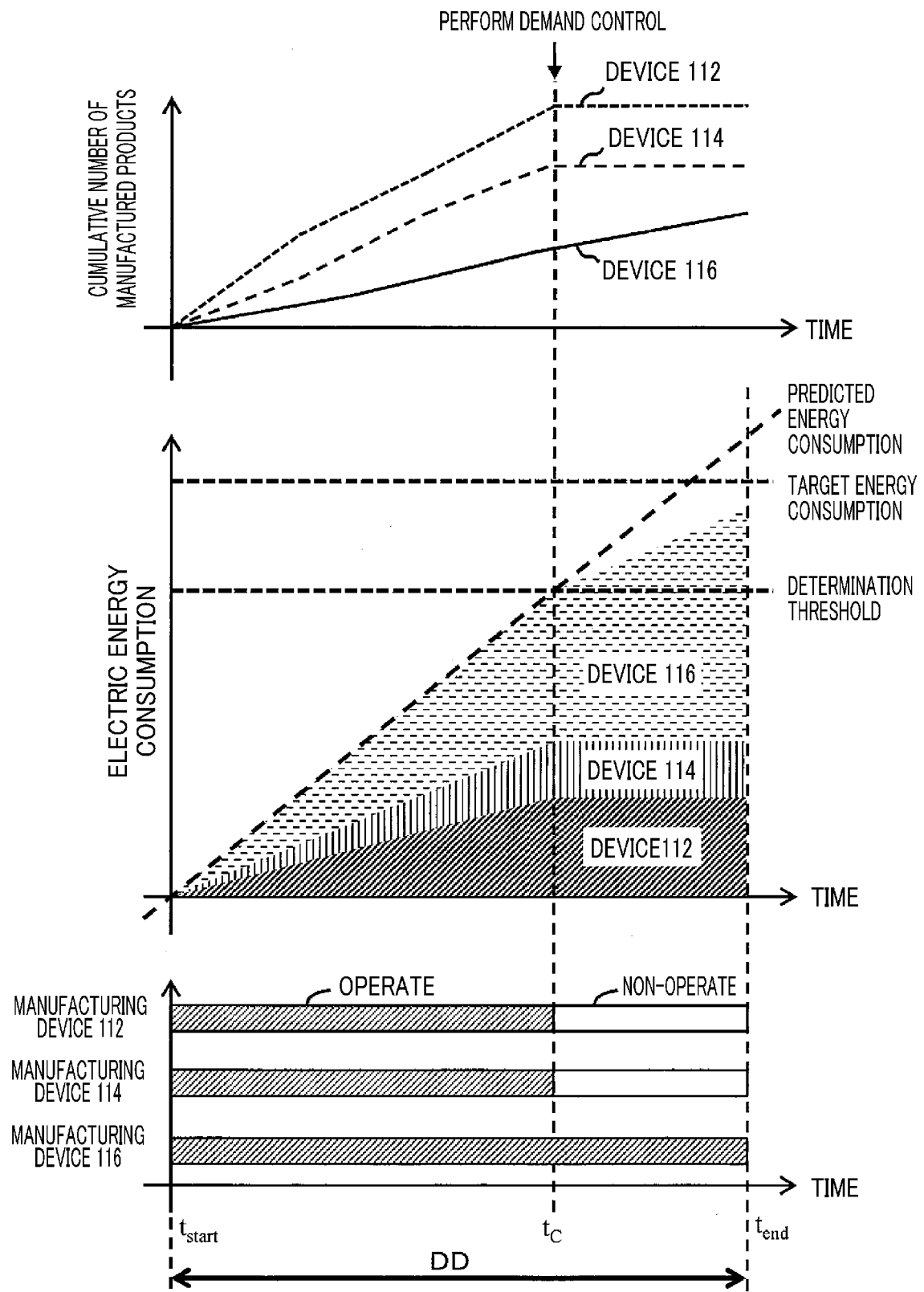
FIG. 4 is a graph showing examples of a cumulative number of manufactured products and energy consumption in the manufacturing system in FIG. 1 and a transition of an operating state of each manufacturing device over time.

FIG. 4 is a graph showing examples of a cumulative number of manufactured products and energy consumption in the manufacturing system 110 in FIG. 1 and a transition of an operating state of each manufacturing device 110 over time. As shown in FIG. 4, the target energy consumption is set as a target value of power saving so as not to change contracted electric power, for example. The target energy consumption is, for example, a value obtained by multiplying contracted electric power by a predetermined period DD. The determination threshold is a value obtained by multiplying the target energy consumption by a predetermined value less than or equal to one (e.g., 0.7). The determination threshold is set to determine whether demand control is necessary or not in order to prevent energy consumption in the period DD from reaching the target energy consumption. The duration of the period DD is 30 minutes, which is a reference period for use in reconsidering contracted electric power in demand contract, for example, but is not limited to 30 minutes. The period DD begins at start time $t_{start}$ and finishes at end time $t_{end}$. The period DD repeatedly occurs.

In block 22, the processor 132 receives values of power consumption of the manufacturing devices 112, 114, and 116 constituting the manufacturing system 110 from the manufacturing devices 112, 114, and 116 or measuring instruments or the like attached to these devices, and writes the values in the memory 142.

In block 24, the processor 132 obtains the sum of power consumption of the manufacturing devices 112, 114, and 116 from the received values of power consumption. The processor 132 further integrates or accumulates, for example, the obtained sum to obtain the sum of energy consumption of the manufacturing devices 112, 114, and 116 after start time $t_{start}$ of the period DD, that is, energy consumption in the entire manufacturing system 110 after start time $t_{start}$, and writes the sum in the memory 142.

In block 26, the processor 132 receives production information from the manufacturing devices 112, 114, and 116 constituting the manufacturing system 110 or measuring instruments or the like attached to these devices, and writes the information in the memory 142. The production information includes the number of manufactured products, the number of non-defective products, the number of defective products, a tact time, and so forth.

In block 28, based on the received production information, the processor 132 obtains a production capacity and writes the production capacity in the memory 142. The production capacity is the number of manufactured products per unit time (manufacturing process capacity), or a tact time (time from start of a process in one cycle by the manufacturing device to end of the process). The production capacity may be a substantial tact time obtained by dividing a tact time by a non-defective ratio, or a substantial number of manufactured products per unit time obtained by multiplying the number of manufactured products per unit time by a non-defective ratio, for example.

In block 30, the processor 132 determines whether electric power demand control is necessary or not. If the energy consumption of the entire manufacturing system 110 obtained in block 24, that is, the sum of energy consumption of the manufacturing devices 112, 114, and 116, reaches the determination threshold, the processor 132 determines that electric power demand control is necessary. Specifically, in the example of FIG. 4, at time $t_C$, the energy consumption of the entire manufacturing system 110 has reached the determination threshold. In such a case, the processor 132 determines that electric power demand control is necessary.

The processor 132 may predict energy consumption of the entire manufacturing system 110 in the period DD by linear extrapolation based on the already obtained energy consumption so that if the predicted energy consumption exceeds target energy consumption, the processor 132 determines that electric power demand control is necessary. Specifically, in the example of FIG. 4, since the predicted energy consumption at end time $t_{end}$ exceeds the target energy consumption, the processor 132 may determine that electric power demand control is necessary. In this manner, it is further ensured that the energy consumption at end time $t_{end}$ of the period DD does not exceed the target energy consumption.

If it is determined that electric power demand control is necessary, the process proceeds to block 32, and otherwise, the process returns to block 22.

Figure 5:
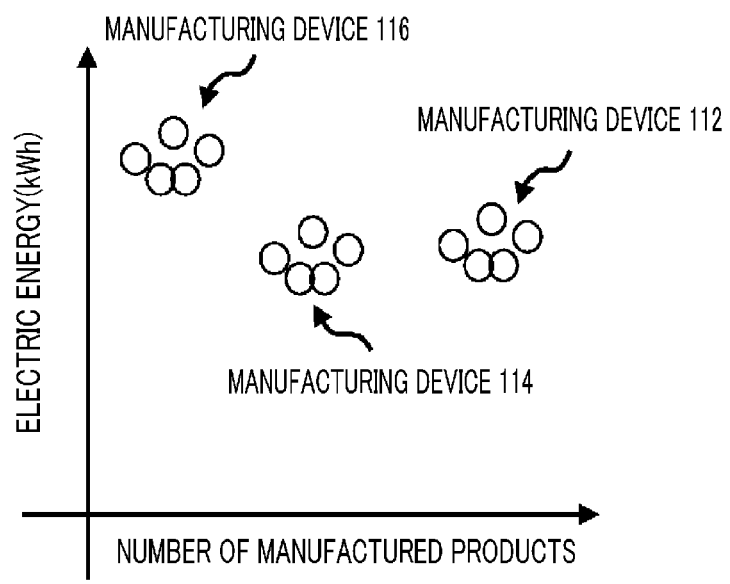
FIG. 5 shows an example relationship between the number of manufactured products and energy consumption of each manufacturing device of the manufacturing system in FIG. 1.
Figure 6:
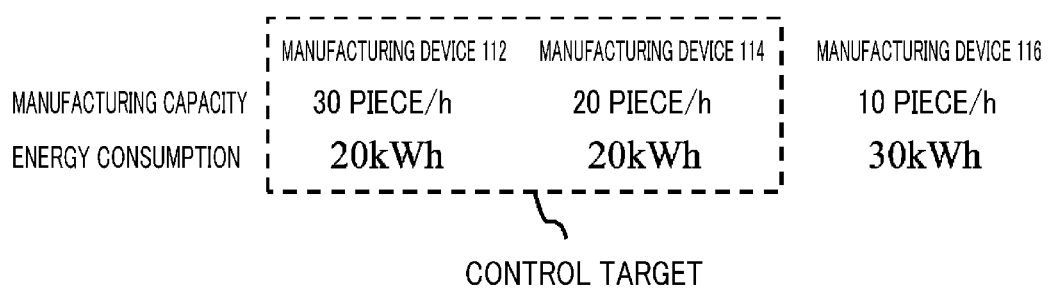
FIG. 6 shows examples of a production capacity and energy consumption of each manufacturing device of the manufacturing system in FIG. 1.

In block 32, the processor 132 determines a manufacturing device that is not a target of electric power demand control. FIG. 5 shows an example relationship between the number of manufactured products and energy consumption of each manufacturing device of the manufacturing system 110 in FIG. 1. Here, the number of manufactured products is the number of products actually manufactured by each manufacturing device within a predetermined time (e.g., one hour). As demonstrated in FIG. 5, the number of manufactured products by the manufacturing device 116 is relatively small. FIG. 6 shows examples of a production capacity and energy consumption of each manufacturing device of the manufacturing system 110 in FIG. 1. The production capacity and the energy consumption in FIG. 6 are latest values of an actual number of manufactured products and actual energy consumption within the predetermined time (e.g., within one hour).

As shown in FIG. 6, among the manufacturing devices 112, 114, and 116, the energy consumption of the manufacturing device 116 is largest. However, in these manufacturing devices, the manufacturing device 116 has the smallest production capacity, and thus, the manufacturing device 116 is a bottleneck. In view of this, in block 32, the processor 132 excludes the manufacturing device 116 in the manufacturing devices 112, 114, and 116 constituting the manufacturing system 110, from the control target of electric power demand control, and sets the other manufacturing devices 112 and 114 as control targets of electric power demand control.

In block 34, the processor 132 transmits a signal instructing the manufacturing devices 112 and 114 not excluded from control targets of electric power demand control to transition to a non-operating state, to the manufacturing devices 112 and 114. That is, demand control is carried out at time $t_C$ in FIG. 4. Thereafter, the process returns to block 22.

Consequently, as shown in FIG. 4, the instructed manufacturing devices 112 and 114 transition to the non-operating state. Since the energy consumption of these devices do not increase after time $t_C$, the energy consumption of the manufacturing system 110 can be reduced. The manufacturing device 116 is kept in the operating state, and continues manufacturing. As described above, since the manufacturing device 116 having the smallest production capacity is excluded from the target of electric power demand control, the cumulative number of manufactured products of the manufacturing device 116 continues to increase, and electric power demand control can be performed without a decrease in production efficiency of the manufacturing system 110.

A part of or a whole of components constituting the control device 130 may be constituted by one system large scale integration (LSI). The system LSI is ultra-multifunction LSI fabricated by integrating a plurality of components on one chip, specifically a computer system including a microprocessor, a ROM, a RAM, and so forth. The RAM stores a computer program. The microprocessor operates in accordance with the computer program so that the system LSI obtains its function.

A part of or a whole of components constituting the control device 130 may be constituted by an IC card or a single module detachably attached to each device. The IC card or the module is a computer system constituted by a microprocessor, a ROM, a RAM, and so forth. The IC card or the module may include the ultra-multifunctional LSI described above. The microprocessor operates in accordance with the computer program so that the IC card or the module achieve functions thereof. The IC card or the module may be tamper resistant.

The present disclosure may be the methods described above. The present disclosure may be a computer program implementing these methods by a computer, or a digital signal constituted by the computer program.

The present disclosure may also be a computer-readable recording medium from which the computer program or the digital signal can be read by a computer, such as a flexible disk, a hard disk, a CD-ROM, an MO, a DVD, a DVD-ROM, a DVD-RAM, a blu-ray disk (BD), or a semiconductor memory. The present disclosure may be the digital signal recorded on these recording media.

The present disclosure may transmit the computer program or the digital signal by way of an electrical communication line, a wireless or wired communication line, a network typified by the Internet, data broadcasting, and so forth.

Many features and advantages of the present disclosure are apparent from the description, and thus, it is intended to cover all such features and advantages of the present disclosure according to the accompanying claims. Furthermore, since many changes and modifications can be readily made by those skilled in the art, the present disclosure should not be limited to the exact configuration and operation of the illustrated and described figures. Accordingly, all suitable modifications and equivalents are to fall within the scope of the present disclosure.

INDUSTRIAL APPLICABILITY

As described above, the present disclosure is useful for, for example, a device and a method for performing electric power demand control.

DESCRIPTION OF REFERENCE CHARACTERS

| | |
|---|---|
| 110 | manufacturing system |
| 112, 114, 116 | manufacturing device |
| 130 | control device |
| 132 | processor |
| 142 | memory |

The invention claimed is:

1. A device for performing electric power demand control on a manufacturing system including a plurality of manufacturing devices, the plurality of manufacturing devices being connected in series, the device comprising:
    one or more processors; and
    one or more non-transitory computer-readable storage media including an instruction for causing the one or more processor to:
        receive values of power consumption of the plurality of manufacturing devices,
        obtain a sum of energy consumption of the plurality of manufacturing devices from the values of power consumption,
        receive production information on each of the plurality of manufacturing devices,
        obtain a production capacity of each of the plurality of manufacturing devices from the production information, and
        perform electric power control on the manufacturing system based on the production capacity of each of the plurality of manufacturing devices and the sum of energy consumption of the plurality of manufacturing devices, wherein
    the performing electric power control on the manufacturing system includes determining that electric power demand control is necessary if the sum of energy consumption reaches a predetermined threshold and excluding one of the plurality of manufacturing devices having a smallest production capacity from a target of electric power demand control.

2. The device according to claim 1, wherein
    the performing electric power control on the manufacturing system includes causing one of the plurality of manufacturing devices that is not excluded from the target of electric power demand control to transition to a non-operating state.

3. The device according to claim 1, wherein
    the performing electric power control on the manufacturing system includes:
        predicting a sum of energy consumption of the plurality of manufacturing devices consumed in a predetermined period to determine that electric power demand control is necessary if the predicted energy consumption exceeds target energy consumption, and
        excluding one of the plurality of manufacturing devices having a smallest production capacity from the target of electric power demand control.

4. A computer-implemented method for performing electric power demand control on a manufacturing system including a plurality of manufacturing devices, the plurality of manufacturing devices being connected in series, the method comprising:
    causing the processor to receive values of power consumption of the plurality of manufacturing devices;
    causing the processor to obtain a sum of energy consumption of the plurality of manufacturing devices from the values of power consumption;
    causing the processor to receive production information on each of the plurality of manufacturing devices;
    causing the processor to obtain a production capacity of each of the plurality of manufacturing devices from the production information; and
    causing the processor to perform electric power control on the manufacturing system based on the production capacity of each of the plurality of manufacturing devices and the sum of energy consumption of the plurality of manufacturing devices, wherein
    the performing electric power control on the manufacturing system includes:
        determining that electric power demand control is necessary if the sum of energy consumption reaches a predetermined threshold and
        excluding one of the plurality of manufacturing devices having a smallest production capacity from a target of electric power demand control.

* * * * *